(12) United States Patent
Ross et al.

(10) Patent No.: US 9,342,506 B2
(45) Date of Patent: *May 17, 2016

(54) IN-CONTEXT EXACT (ICE) MATCHING

(71) Applicant: SDL Enterprise Technologies, Inc., Los Angeles, CA (US)

(72) Inventors: Russell G. Ross, Cambridge (GB); Kevin Gillespie, Dorchester, MA (US)

(73) Assignee: SDL Inc., Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,077

(22) Filed: Oct. 20, 2014

(65) Prior Publication Data

US 2015/0169554 A1 Jun. 18, 2015

Related U.S. Application Data

(63) Continuation of application No. 13/175,783, filed on Jul. 1, 2011, now Pat. No. 8,874,427, which is a continuation of application No. 11/071,706, filed on Mar. 3, 2005, now Pat. No. 7,983,896.

(60) Provisional application No. 60/550,795, filed on Mar. 5, 2004.

(51) Int. Cl.
*G06F 17/28* (2006.01)
*G06F 17/30* (2006.01)

(52) U.S. Cl.
CPC ...... *G06F 17/2836* (2013.01); *G06F 17/30985* (2013.01)

(58) Field of Classification Search
CPC . G06F 17/274; G06F 17/2785; G06F 17/271; G06F 17/3071; G06F 17/2755; G06F 17/30; G06F 17/5068; G06F 17/30949; G10L 15/18
USPC ........ 704/4, 9, 260, 251, 2, 235, 270, 277, 5; 341/107; 715/708, 532, 268; 707/3, 707/797, 5
See application file for complete search history.

(56) References Cited

U.S. PATENT DOCUMENTS 4,661,924 A 4/1987 Okamoto et al.
4,674,044 A 6/1987 Kalmus et al.
(Continued)

FOREIGN PATENT DOCUMENTS

AU 199938259 11/1999
AU 761311 9/2003
(Continued)

OTHER PUBLICATIONS

U.S. Appl. No. 14/519,077, Ross et al.*
(Continued)

*Primary Examiner* — Michael Colucci
(74) *Attorney, Agent, or Firm* — Carr & Ferrell LLP

(57) ABSTRACT

Methods, systems and program product are disclosed for determining matching level of a text lookup segment with a plurality of source texts in a translation memory in terms of context. The invention determines exact matches for the lookup segment in the plurality of source texts, and determines, in the case that at least one exact match is determined, that a respective exact match is an in-context exact match for the lookup segment in the case that a context of the lookup segment matches that of the respective exact match. Degree of context matching required can be predetermined, and results prioritized. The invention also includes methods, systems and program products for storing a translation pair of source text and target text in a translation memory including context, and the translation memory so formed. The invention ensures that content is translated the same as previously translated content and reduces translator intervention.

32 Claims, 6 Drawing Sheets

(56) References Cited

U.S. PATENT DOCUMENTS

| | | |
|---|---|---|
| 4,677,552 A | 6/1987 | Sibley, Jr. |
| 4,789,928 A | 12/1988 | Fujisaki |
| 4,903,201 A | 2/1990 | Wagner |
| 4,916,614 A | 4/1990 | Kaji et al. |
| 4,962,452 A | 10/1990 | Nogami et al. |
| 4,992,940 A | 2/1991 | Dworkin |
| 5,005,127 A | 4/1991 | Kugimiya et al. |
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,555,343 A * | 9/1996 | Luther .................... G10L 13/08 704/258 |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,825 A | 1/1998 | Sotomayor |
| 5,710,562 A | 1/1998 | Gormish et al. |
| 5,715,402 A | 2/1998 | Popolo |
| 5,724,593 A | 3/1998 | Hargrave, III et al. |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,802,525 A | 9/1998 | Rigoutsos |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A | 12/1998 | Yamauchi et al. |
| 5,845,306 A | 12/1998 | Schabes et al. |
| 5,848,386 A | 12/1998 | Motoyama |
| 5,850,442 A | 12/1998 | Muftic |
| 5,850,561 A | 12/1998 | Church et al. |
| 5,864,788 A | 1/1999 | Kutsumi |
| 5,884,246 A | 3/1999 | Boucher et al. |
| 5,895,446 A | 4/1999 | Takeda et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,413 A | 10/1999 | Beauregard et al. |
| 5,987,401 A | 11/1999 | Trudeau |
| 5,987,403 A | 11/1999 | Sugimura |
| 6,044,363 A | 3/2000 | Mori et al. |
| 6,047,299 A | 4/2000 | Kaijima |
| 6,070,138 A * | 5/2000 | Iwata .................... G10L 13/00 704/260 |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,260,008 B1 | 7/2001 | Sanfilippo |
| 6,278,969 B1 | 8/2001 | King et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 | 2/2002 | Clark |
| 6,345,245 B1 | 2/2002 | Sugiyama et al. |
| 6,347,316 B1 | 2/2002 | Redpath |
| 6,353,824 B1 | 3/2002 | Boguraev et al. |
| 6,385,568 B1 | 5/2002 | Brandon et al. |
| 6,393,389 B1 | 5/2002 | Chanod et al. |
| 6,401,105 B1 | 6/2002 | Carlin et al. |
| 6,442,524 B1 | 8/2002 | Ecker et al. |
| 6,470,306 B1 | 10/2002 | Pringle et al. |
| 6,473,729 B1 | 10/2002 | Gastaldo et al. |
| 6,526,426 B1 | 2/2003 | Lakritz |
| 6,622,121 B1 * | 9/2003 | Crepy .................... G10L 15/01 704/243 |
| 6,623,529 B1 | 9/2003 | Lakritz |
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,782,384 B2 | 8/2004 | Sloan et al. |
| 6,952,691 B2 | 10/2005 | Drissi et al. |
| 6,993,473 B2 | 1/2006 | Cartus |
| 7,020,601 B1 | 3/2006 | Hummel et al. |
| 7,100,117 B1 * | 8/2006 | Chwa .................... H04N 21/235 375/E7.024 |
| 7,110,938 B1 | 9/2006 | Cheng et al. |
| 7,155,440 B1 | 12/2006 | Kronmiller et al. |
| 7,185,276 B2 * | 2/2007 | Keswa .................... H04L 63/08 707/999.001 |
| 7,194,403 B2 | 3/2007 | Okura et al. |
| 7,209,875 B2 | 4/2007 | Quirk et al. |
| 7,266,767 B2 | 9/2007 | Parker |
| 7,343,551 B1 | 3/2008 | Bourdev |
| 7,353,165 B2 | 4/2008 | Zhou et al. |
| 7,533,338 B2 | 5/2009 | Duncan et al. |
| 7,580,960 B2 | 8/2009 | Travieso et al. |
| 7,587,307 B2 | 9/2009 | Cancedda et al. |
| 7,594,176 B1 | 9/2009 | English |
| 7,596,606 B2 * | 9/2009 | Codignotto .......... G06Q 10/107 379/67.1 |
| 7,627,479 B2 | 12/2009 | Travieso et al. |
| 7,640,158 B2 * | 12/2009 | Detlef .................... G10L 15/26 704/235 |
| 7,693,717 B2 * | 4/2010 | Kahn et al. .................... 704/260 |
| 7,698,124 B2 | 4/2010 | Menezes et al. |
| 7,925,494 B2 | 4/2011 | Cheng et al. |
| 7,983,896 B2 | 7/2011 | Ross et al. |
| 8,050,906 B1 * | 11/2011 | Zimmerman ........ G06F 17/2836 704/2 |
| 8,521,506 B2 | 8/2013 | Lancaster et al. |
| 8,620,793 B2 | 12/2013 | Knyphausen et al. |
| 8,874,427 B2 | 10/2014 | Ross et al. |
| 8,935,148 B2 | 1/2015 | Christ |
| 8,935,150 B2 | 1/2015 | Christ |
| 2002/0002461 A1 * | 1/2002 | Tetsumoto ............ G10L 13/08 704/270.1 |
| 2002/0093416 A1 | 7/2002 | Goers et al. |
| 2002/0099547 A1 | 7/2002 | Chu et al. |
| 2002/0103632 A1 | 8/2002 | Dutta et al. |
| 2002/0110248 A1 * | 8/2002 | Kovales .................... G10L 13/00 381/56 |
| 2002/0111787 A1 | 8/2002 | Knyphausen et al. |
| 2002/0138250 A1 | 9/2002 | Okura et al. |
| 2002/0165708 A1 | 11/2002 | Kumhyr |
| 2002/0169592 A1 | 11/2002 | Aityan |

(56) References Cited

U.S. PATENT DOCUMENTS

| | | | |
|---|---|---|---|
| 2002/0198701 A1 | 12/2002 | Moore | |
| 2003/0004702 A1 | 1/2003 | Higinbotham | |
| 2003/0016147 A1 | 1/2003 | Evans | |
| 2003/0040900 A1 | 2/2003 | D'Agostini | |
| 2003/0069879 A1 | 4/2003 | Sloan et al. | |
| 2003/0078766 A1* | 4/2003 | Appelt | G06F 17/30616 704/9 |
| 2003/0105621 A1 | 6/2003 | Mercier | |
| 2003/0120479 A1 | 6/2003 | Parkinson et al. | |
| 2003/0158723 A1 | 8/2003 | Masuichi et al. | |
| 2003/0182279 A1 | 9/2003 | Willows | |
| 2003/0194080 A1* | 10/2003 | Michaelis | H04M 3/42153 379/257 |
| 2003/0229622 A1 | 12/2003 | Middelfart | |
| 2003/0233222 A1 | 12/2003 | Soricut et al. | |
| 2004/0122656 A1 | 6/2004 | Abir | |
| 2004/0172235 A1 | 9/2004 | Pinkham et al. | |
| 2005/0021323 A1 | 1/2005 | Li | |
| 2005/0055212 A1* | 3/2005 | Nagao | G10L 13/00 704/270.1 |
| 2005/0075858 A1 | 4/2005 | Pournasseh et al. | |
| 2005/0094475 A1* | 5/2005 | Naoi | G10L 13/00 365/232 |
| 2005/0171758 A1 | 8/2005 | Palmquist | |
| 2005/0197827 A1 | 9/2005 | Ross et al. | |
| 2005/0222837 A1 | 10/2005 | Deane | |
| 2005/0222973 A1* | 10/2005 | Kaiser | G06F 17/30011 |
| 2005/0273314 A1 | 12/2005 | Chang et al. | |
| 2006/0015320 A1 | 1/2006 | Och | |
| 2006/0095848 A1* | 5/2006 | Naik | G06F 9/4443 715/716 |
| 2006/0136277 A1 | 6/2006 | Perry | |
| 2006/0256139 A1 | 11/2006 | Gikandi | |
| 2006/0287844 A1 | 12/2006 | Rich | |
| 2007/0118378 A1* | 5/2007 | Skuratovsky | G10L 13/033 704/260 |
| 2007/0136470 A1 | 6/2007 | Chikkareddy et al. | |
| 2007/0150257 A1 | 6/2007 | Cancedda et al. | |
| 2007/0192110 A1 | 8/2007 | Mizutani et al. | |
| 2007/0230729 A1* | 10/2007 | Naylor | H04R 25/407 381/320 |
| 2007/0233460 A1 | 10/2007 | Lancaster et al. | |
| 2007/0233463 A1 | 10/2007 | Sparre | |
| 2007/0244702 A1* | 10/2007 | Kahn | G10L 15/22 704/260 |
| 2007/0294076 A1 | 12/2007 | Shore et al. | |
| 2008/0077395 A1 | 3/2008 | Lancaster et al. | |
| 2008/0141180 A1* | 6/2008 | Reed | G06F 17/30017 715/854 |
| 2008/0147378 A1 | 6/2008 | Hall | |
| 2008/0243834 A1 | 10/2008 | Rieman et al. | |
| 2008/0294982 A1 | 11/2008 | Leung et al. | |
| 2009/0132230 A1 | 5/2009 | Kanevsky et al. | |
| 2009/0187577 A1* | 7/2009 | Reznik | G06F 17/3089 |
| 2009/0204385 A1 | 8/2009 | Cheng et al. | |
| 2009/0248182 A1* | 10/2009 | Logan | G06F 17/30053 700/94 |
| 2009/0248482 A1 | 10/2009 | Knyphausen et al. | |
| 2009/0326917 A1 | 12/2009 | Hegenberger | |
| 2010/0223047 A1 | 9/2010 | Christ | |
| 2010/0241482 A1 | 9/2010 | Knyphausen et al. | |
| 2010/0262621 A1 | 10/2010 | Ross et al. | |
| 2011/0184719 A1 | 7/2011 | Christ | |
| 2012/0046934 A1 | 2/2012 | Cheng et al. | |
| 2012/0095747 A1 | 4/2012 | Ross et al. | |
| 2012/0185235 A1 | 7/2012 | Albat | |
| 2013/0346062 A1 | 12/2013 | Lancaster et al. | |
| 2014/0006006 A1 | 1/2014 | Christ | |
| 2014/0012565 A1 | 1/2014 | Lancaster et al. | |
| 2015/0142415 A1 | 5/2015 | Cheng et al. | |

FOREIGN PATENT DOCUMENTS

| | | |
|---|---|---|
| BE | 1076861 | 6/2005 |
| CA | 231184 | 7/2009 |
| CH | 1076861 | 6/2005 |
| CN | 1179289 | 12/2004 |
| CN | 1770144 | 5/2006 |
| CN | 101019113 | 8/2007 |
| CN | 101826072 | 9/2010 |
| CN | 101248415 | 10/2010 |
| CN | 102053958 | 5/2011 |
| DE | 69925831 | 6/2005 |
| DE | 2317447 | 1/2014 |
| EP | 0262938 | 4/1988 |
| EP | 0668558 | 8/1995 |
| EP | 0887748 | 12/1998 |
| EP | 1076861 | 2/2001 |
| EP | 1266313 | 12/2002 |
| EP | 1076861 | 6/2005 |
| EP | 1787221 | 5/2007 |
| EP | 1889149 | 2/2008 |
| EP | 2226733 | 9/2010 |
| EP | 2317447 | 5/2011 |
| EP | 2336899 | 6/2011 |
| EP | 2317447 | 1/2014 |
| FR | 1076861 | 6/2005 |
| GB | 1076861 | 6/2005 |
| GB | 2433403 | 6/2007 |
| GB | 2468278 | 9/2010 |
| GB | 2474839 | 5/2011 |
| GB | 2317447 | 1/2014 |
| IE | 1076861 | 6/2005 |
| JP | H04-152466 | 5/1992 |
| JP | H05-135095 | 6/1993 |
| JP | H05-197746 | 8/1993 |
| JP | H06-035962 | 2/1994 |
| JP | H06-259487 | 9/1994 |
| JP | H07-093331 | 4/1995 |
| JP | H08-055123 | 2/1996 |
| JP | H09-114907 | 5/1997 |
| JP | H10-063747 | 3/1998 |
| JP | H10-097530 | 4/1998 |
| JP | 2002513970 | 5/2002 |
| JP | 2003150623 | 5/2003 |
| JP | 2004318510 | 11/2004 |
| JP | 2005107597 | 4/2005 |
| JP | 2005197827 | 7/2005 |
| JP | 2007249606 | 9/2007 |
| JP | 2008152670 | 7/2008 |
| JP | 2008152760 | 7/2008 |
| JP | 4718687 | 4/2011 |
| JP | 2011095841 | 5/2011 |
| JP | 5473533 | 2/2014 |
| MX | 244945 | 4/2007 |
| NL | 2317447 | 1/2014 |
| WO | WO 9406086 | 3/1994 |
| WO | WO 9804061 | 1/1998 |
| WO | WO 9957651 | 11/1999 |
| WO | WO 0057320 | 9/2000 |
| WO | WO 0101289 | 1/2001 |
| WO | WO 0129696 | 4/2001 |
| WO | WO 0229622 | 4/2002 |
| WO | WO 2006016171 | 2/2006 |
| WO | WO 2006121849 | 11/2006 |
| WO | WO 2008055360 | 5/2008 |
| WO | WO 2008083503 | 7/2008 |
| WO | WO 2008147647 | 12/2008 |

OTHER PUBLICATIONS

Brief Communication mailed Jun. 17, 2015 in European Patent Application 06759147.9 filed May 8, 2006.

Somers, H. "EBMT Seen as Case-based Reasoning" Mt Summit VIII Workshop on Example-Based Machine Translation, 2001, pp. 56-65, XP055196025.

The Minutes of Oral Proceedings mailed Mar. 2, 2015 in European Patent Application 00902634.5 filed Jan. 26, 2000.

First Examination Report mailed Nov. 26, 2009 for European Patent Application 05772051.8, filed May 8, 2006.

(56) References Cited

OTHER PUBLICATIONS

Second Examination Report mailed Feb. 19, 2013 for European Patent Application 06759147.9, filed May 8, 2006.
Langlais, et al. "TransType: a Computer-Aided Translation Typing System", in Conference on Language Resources and Evaluation, 2000.
First Notice of Reasons for Rejection mailed Jun. 18, 2013 for Japanese Patent Application 2009-246729, filed Oct. 27, 2009.
First Notice of Reasons for Rejection mailed Jun. 4, 2013 for Japanese Patent Application 2010-045531, filed Oct. 27, 2009.
Rejection Decision mailed May 14, 2013 for Chinese Patent Application 200910253192.6, filed Dec. 14, 2009.
Matsunaga, et al. "Sentence Matching Algorithm of Revised Documents with Considering Context Information," IEICE Technical Report, 2003, pp. 43-48.
Pennington, Paula K. Improving Quality in Translation Through an Awareness of Process and Self-Editing Skills. Eastern Michigan University, ProQuest, UMI Dissertations Publishing, 1994.
Notice of Allowance mailed Jan. 7, 2014 for Japanese Patent Application 2009-246729, filed Oct. 27, 2009.
Kumano et al., "Japanese-English Translation Selection Using Vector Space Model," Journal of Natural Language Processing; vol. 10; No. 3; (2003); pp. 39-59.
Final Rejection and a Decision to Dismiss the Amendment mailed Jan. 7, 2014 for Japanese Patent Application 2010-045531, filed Mar. 2, 2010.
Office Action mailed Feb. 24, 2014 for Chinese Patent Application No. 201010521841.9, filed Oct. 25, 2010.
Extended European Search Report mailed Oct. 24, 2014 for European Patent Application 10185842.1, filed Oct. 1, 2010.
Summons to attend oral proceeding pursuant to Rule 115(1)(EPC) mailed Oct. 13, 2014 in European Patent Application 00902634.5 filed Jan. 26, 2000.
Summons to attend oral proceeding pursuant to Rule 115(1)(EPC) mailed Feb. 3, 2015 in European Patent Application 06759147.9 filed May 8, 2006.
Decision to Refuse mailed Mar. 2, 2015 in European Patent Application 00902634.5 filed Jan. 26, 2000.
Komatsu, H et al, "Corpus-based predictive text input", "Proceedings of the 2005 International Conference on Active Media Technology", 2005, IEEE, pp. 75-80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111-131.
De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005].
Web Page—New Auction Art Preview, www.netauction.net/dragonart.html, "Come bid on original illustrations," by Greg & Tim Hildebrandt, Feb. 3, 2001. (last accessed Nov. 16, 2011).
Web Pages—BidNet, www.bidnet.com, "Your link to the State and Local Government Market," including Bid Alert Service, Feb. 7, 2009. (last accessed Nov. 16, 2011).
Web Pages—Christie's, www.christies.com, including "How to Buy," and "How to Sell," Apr. 23, 2009. (last accessed Nov. 16, 2011).
Web Pages—Artrock Auction, www.commerce.com, Auction Gallery, Apr. 7, 2007. (last accessed Nov. 16, 2011).
Trados Translator's Workbench for Windows, 1994-1995, Trados GbmH, Stuttgart, Germany, pp. 9-13 and 27-96.
Notification of Reasons for Refusal for Japanese Application No. 2000-607125 mailed on Nov. 10, 2009 (Abstract Only).
Ross et al., U.S. Appl. No. 11/071,706, filed Mar. 3, 2005, Office Communication dated Dec. 13, 2007.
Ross et al., U.S. Appl. No. 11/071,706, filed Mar. 3, 2005, Office Communication dated Oct. 6, 2008.
Ross et al., U.S. Appl. No. 11/071,706, filed Mar. 3, 2005, Office Communication dated Jun. 9, 2009.
Ross et al., U.S. Appl. No. 11/071,706, filed Mar. 3, 2005, Office Communication dated Feb. 18, 2010.
Colucci, Office Communication for U.S. Appl. No. 11/071,706 dated Sep. 24, 2010.
Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.
International Search Report and Written Opinion mailed Sep. 4, 2007 in Patent Cooperation Treaty Application No. PCT/US06/17398.
XP 002112717—Machine translation software for the Internet, Harada K.; et al, vol. 28, Nr:2, pp. 66-74. Sanyo Technical Review—San'yo Denki Giho, Hirakata, JP—ISSN 0285-516X, Oct. 1, 1996.
XP 000033460—Method to Make a Translated Text File Have the Same Printer Control Tags as the Original Text File, vol. 32, Nr:2, pp. 375-377, IBM Technical Disclosure Bulletin, International Business Machines Corp. (Thornwood), US—ISSN 0018-8689, Jul. 1, 1989.
XP 002565038—Integrating Machine Translation into Translation Memory Systems, Matthias Heyn, pp. 113-126, TKE. Terminology and Knowledge Engineering. ProceedingsInternational Congress on Terminology and Knowledge Engineering, Aug. 29-30, 1996.
XP 002565039—Linking translation memories with example-based machine translation, Michael Carl; Silvia Hansen, pp. 617-624, Machine Translation Summit. Proceedings, Sep. 1, 1999.
XP 55024828—TransType2—An Innovative Computer-Assisted Translation System, ACL 2004, Jul. 21, 2004, Retrieved from the Internet: http://www.mt-archive.info/ACL-2004-Esteban.pdf [retrieved on Apr. 18, 2012].
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland.
Sanfillipo, Section 5.2 Multiword Recognition and Extraction, Eagles LE3-4244, Preliminary Recommendations on Lexical Semantic Encoding, Jan. 7, 1999.
Hindle et al., Structural Ambiguity and lexical Relations, 1993, Association for Computational Linguistics, vol. 19, No. 1, pp. 103-120.
Ratnaparkhi, A Maximum Entropy Model for Part-Of-Speech Tagging, 1996, Proceedings for the conference on empirical methods in natural language processing, V.1, pp. 133-142.
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. of EAMT, 2006, pp. 33-40 (2006).
Okura, Seiji et al., "Translation Assistance by Autocomplete," The Association for Natural Language Processing, Publication 13th Annual Meeting Proceedings, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Non-parallel, Comparable Texts," Proceeding COLING '998 Proceedings of the 17th International Conference on Computational Lingiustics, 1998.
First Office Action mailed Dec. 26, 2008 in Chinese Patent Application 200580027102.1, filed Aug. 11, 2005.
Second Office Action mailed Aug. 28, 2009 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.

(56) References Cited

OTHER PUBLICATIONS

Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 10189145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdoms Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150.9, filed Dec. 14, 2009.
First Examination Report mailed Jun. 16, 2011 for European Patent Application 09179150.9, filed Dec. 14, 2009.
Notice of Reasons for Rejection mailed Jul. 31, 2012 for Japanese Patent Application 2010-045531, filed Mar. 2, 2010.
First Examination Report mailed Oct. 26, 2012 for United Kingdom Patent Application GB0903418.2, filed Mar. 2, 2009.
First Office Action mailed Jun. 19, 2009 for Chinese Patent Application 200680015388.6, filed May 8, 2006.
Decision to Refuse mailed Aug. 24, 2015 in European Patent Application 06759147.9, filed May 8, 2006.

* cited by examiner

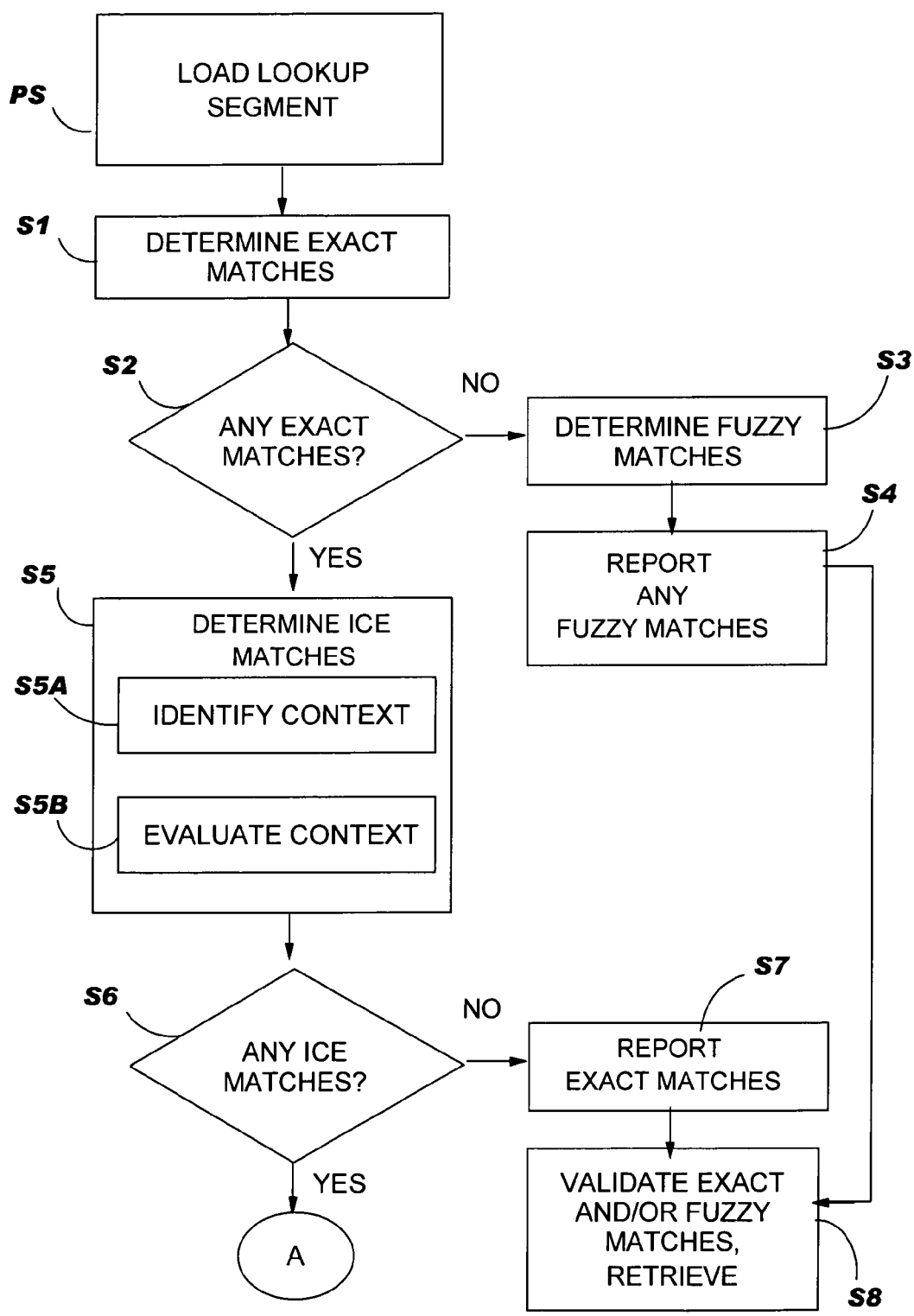

IN-CONTEXT EXACT (ICE) MATCHING

CROSS REFERENCES TO RELATED APPLICATIONS

This non-provisional application is a continuation application and claims the benefit of U.S. Non-Provisional patent application Ser. No. 13/175,783 filed on Jul. 1, 2011, titled "In-Context Exact (ICE) Matching" (Issued as U.S. Pat. No. 8,874,427 on Oct. 28, 2014), which is a continuation application and claims the benefit of U.S. Non-Provisional patent application Ser. No. 11/071,706 filed on Mar. 3, 2005, titled "In-Context Exact (ICE) Matching" (Issued as U.S. Pat. No. 7,983,896 on Jul. 19, 2011), which claims the benefit of U.S. Provisional Patent Application No. 60/550,795, filed on Mar. 5, 2004, titled "In-Context Exact (ICE) Matching", all of which are hereby incorporated by reference in their entirety including all references cited therein.

BACKGROUND OF THE INVENTION

1. Technical Field

This invention relates generally to processing content, and more particularly, to ensuring an exact translation match to source content including context to simplify and otherwise facilitate translation and other processing functions associated with the content.

2. Related Art

As information becomes more accessible on a global basis, especially given the advent and rapid utilization of the Internet and the World-Wide-Web, the role of translation has shifted away from simple transcription of source text into a target language. Translators today must ensure the timely and accurate deployment of the translated content to designated sites and customers. As such, the increased need for content translation has prompted numerous companies to develop tools that automate and aid in part of the translation process. Given that translators seek to translate content as quickly as possible, translation can be made more efficient with the greater flexibility in software functionality and the ability to save previous translations for future use. Therefore, tools have been created to save translations, including blocks and/or segments of translations, in computer memory ("translation memory" or "TM").

Translation memories, also known as translation databases, are collections of entries where a source text is associated with its corresponding translation in one or more target languages. Translation memory includes a database that stores source and target language pairs of text segments that can be retrieved for use with present texts and texts to be translated in the future. Typically, TMs are used in translation tools: when the translator "opens" a segment, the application looks up the database for equivalent source text. The result is a list of matches usually ranked with a score expressing the percentage of similarity between the source text in the document and in the TM. The translator or a different TM system provides the target text segments that are paired with the lookup segments so that the end product is a quality translation.

There are many computer-assisted translation ("CAT") tools available to assist the translator, such as bilingual and multilingual dictionaries, grammar and spell checkers and terminology software, but TM goes one step further by making use of these other CAT tools while at the same time matching up the original source document stored in its database with the updated or revised document through exact and fuzzy matching. An exact match (100% match) is a match where there is no difference (or no difference that cannot be handled automatically by the tool) between the source text in the document and the source text in the TM. A fuzzy match (less than 100% match) is a match where the source text in the document is very similar, but not exactly the same, as the source text in the TM. Duplicated exact matches are also often treated as fuzzy matches. A TM system is used as a translator's aid, storing a human translator's text in a database for future use. For instance, TM can be utilized when a translator translates the original text, using translation memory to store the paired source and target segments. The translator could then reuse the stored texts to translate the revised or updated version of the text. Only the segments of the new text that do not match the old one would have to be translated. The alternative would be to use a manual translation system or a different CAT system to translate the original text. The TM system could then be used by a translator to translate the revision or update by aligning the texts produced by a translator or other CAT system and storing them in the TM database for present and future work. The translator could then proceed to translate only the segments of the new text, using TM as described above.

There are many advantages in using TMs: The translation can go much faster, avoid unnecessary re-typing of existing translations, and/or enable a translator to change only certain parts of the text. TMs also allow a better control of the quality of the translation. In the related art, TM was employed to speed the translation step in large batch projects. For example, a software company may release version 1 of its software product and need to translate the accompanying documentation. The documentation is broken into sentences and translated, with all sentence pairs captured in TM. Two years later the company releases version 2 of its software. The documentation has changed significantly, but there is also a significant portion similar to the original documentation. This time, as translators translate the documentation, their work is reduced through leveraging exact and fuzzy matches from the TM. As this example illustrates, TM is typically used as an aid in a pipeline process. In the related art, there are also some limitations with the utilization of TM.

Automatically leveraging translation using exact matches (without validating them) can generate incorrect translation since there is no verification of the context where the new segment is used compared to where the original one was used: this is the difference between true reuse and recycling. In the related art, TM systems are recycling systems. With Web content, and now with many types of content, it is common for a document to be translated, and then have minor changes made to it, and then have need for it to be translated again. For example, a web document listing the advantages of a product might be translated, but then a new advantage might be added and the document would therefore need to be translated again. In the related art, TM would reduce the effort of translating the document a second time. Exact matches for most sentences would exist where the source text was identical to one or more entries in the TM. The translator then makes sure that the right exact match is chosen for each by evaluating the appropriateness of a match to contextual information. However, the related art does not provide for a determination of content context. In addition, within the related art, there is no automated process for accurately choosing the best exact match for a given segment or validating whether a given exact match is an appropriate match for the context to which it is being applied. As such, a translator is required to validate matches. The fact that a translator needs to validate and possibly perform an action for every sentence when just a few words may have changed, given that under the related art a segment may be translated differently under different circumstances or contexts, is grossly inefficient.

In view of the foregoing, there is a need in the art for an automated process which accurately validates whether a given exact match is an appropriate match for the context to which it is being applied.

SUMMARY OF THE INVENTION

The invention includes methods, systems and program product for determining a matching level of a text lookup segment with a plurality of source texts in a translation memory in terms of context. In particular, the invention determines any exact matches for the lookup segment in the plurality of source texts, and determines, in the case that at least one exact match is determined, that a respective exact match is an in-context exact (ICE) match for the lookup segment in the case that a context of the lookup segment matches that of the respective exact match. The degree of context matching required can be predetermined, and results prioritized. The invention also includes methods, systems and program products for storing a translation pair of source text and target text in a translation memory including context, and the translation memory so formed. The invention ensures that content is translated the same as previously translated content and reduces translator intervention.

A first aspect of the invention is directed to a method of determining a matching level of a plurality of source texts stored in a translation memory to a lookup segment to be translated, the method comprising the steps of: determining any exact matches for the lookup segment in the plurality of source texts; and determining, in the case that at least one exact match is determined, that a respective exact match is an in-context exact (ICE) match for the lookup segment in the case that a context of the lookup Segment matches that of the respective exact match.

A second aspect of the invention includes a system for determining a matching level of a plurality of source texts stored in a translation memory to a lookup segment to be translated, the system comprising: means for determining any exact matches for the lookup segment in the plurality of source texts; and means for determining, in the case that at least one exact match is determined, that a respective exact match is an in-context exact (ICE) match for the lookup segment in the case that a context of the lookup segment matches that of the respective exact match.

A third aspect of the invention related to a program product stored on a computer readable medium for determining a matching level of a plurality of source texts stored in a translation memory to a lookup segment to be translated, the computer readable medium comprising program code for performing the following steps: determining any exact matches for the lookup segment in the plurality of source texts; and determining, in the case that at least one exact match is determined, that a respective exact match is an in-context exact (ICE) match for the lookup segment in the case that a context of the lookup segment matches that of the respective exact match.

A fourth aspect of the invention is directed to a method of storing a translation pair of source text and target text in a translation memory, the method comprising the steps of: assigning a context to the translation pair; and storing the context with the translation pair.

A fifth aspect of the invention is directed to a system for storing a translation pair of source text and target text in a translation memory, the system comprising: means for assigning a context to the translation pair; and means for storing the context with the translation pair.

A sixth aspect of the invention is relates to a program product stored on a computer readable medium for storing a translated text segment for storage in a translation memory, the computer readable medium comprising program code for performing the following steps: assigning a context to the translated text segment; and storing the context with the translated text segment.

A seventh aspect of the invention includes translation memory comprising: a plurality of source texts for comparison to a lookup segment; and a context identifier for each source text.

An eighth aspect of the invention relates to a client-side system for interacting with a translation system including a translation memory, the system comprising: means for assigning a segment identifier to a segment to be translated by the translation system, the segment identifier indicating a usage context of the segment; and means for communicating the segment identifier assignment for storage as part of the translation memory.

A ninth aspect of the invention includes a program product stored on a computer readable medium for interacting with a translation system including a translation memory having a plurality of source texts, the computer readable medium comprising program code for performing the following steps: assigning a segment identifier to a segment to be translated by the translation system, the segment identifier indicating a usage context of the segment; and communicating the segment identifier assignment for storage as part of the translation memory.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein:

FIGS. 2A-B show a flow diagram of one embodiment of an operational methodology of the system of FIG. 1.

DETAILED DESCRIPTION

Figure 1:
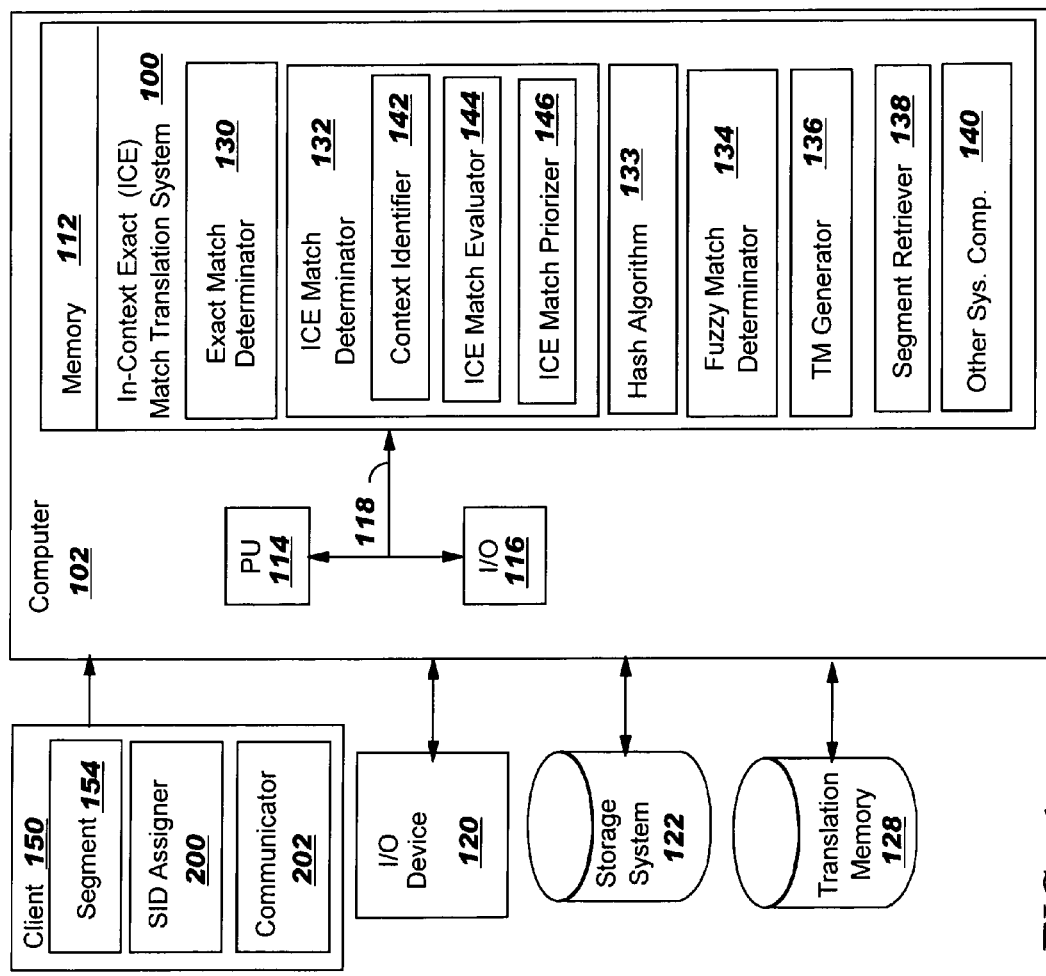
FIG. 1 shows a block diagram of a computer system using an ICE match translation system according to the invention.

The detailed description includes the following headings for convenience purposes only: I. Definitions, II. General Overview, III. System Overview, IV. Operational Methodology, and V. Conclusion.

I. DEFINITIONS

"Asset" means a content source defining a bound collection of related content or grouping of text segments, e.g., by context, usage, size, etc. In general, an asset is associable to a document, such as a hypertext markup language (HTML) file, a Microsoft® Word® document, or a simple text file. However, some assets do not correspond to file system files. The asset may in fact be defined from the columns of a database table or the structures within an extensible markup language (XML) repository. Regardless of how they are represented physically, they all share the common purpose—defining a bound collection of related content that can be accessed, manipulated, and ultimately, translated. An asset may contain content, formatting information, and internal structural data that depends on the nature of the asset.

"Source asset" refers to the asset from which a lookup segment is drawn.

"Segment" includes a translatable chunk of content, e.g., a phrase, sentence, paragraph, etc. It represents the smallest unit of translation work. In practice, a segment can represent a paragraph, a sentence or even a sentence fragment. Segments typically are not single words, though single word segments can be used.

"Source text" refers to the text within the translation memory that corresponds to the original (source) language, which is the language being translated. The source text is compared to the lookup segment from the asset to during the match lookup process in order to find a match.

"Target text" includes the translation of the source text for a particular locale, i.e., it is one half of a translation memory TM entry.

"Translation memory" (abbreviated TM) includes a repository including TM entries. A TM can include TM entries for any number of locales. For example, it can contain entries for English-to-French, Greek-to-Russian, Albanian-to-Turkish, etc.

"TM entry" includes a translation pair stored in the translation memory that maps source text to target text. It is specific for a given translation pair, which includes a source text and target text locale pair, and is usually associated with the asset whose translation produced this translation pair. In effect, a TM entry represents a previous translation, which can be reused later. In addition, each TM entry according to the invention includes a context portion that identifies the context of the related source text and target text pair.

"Exact match" means a source text that contains source text that is completely identical to the lookup text from the asset at the moment it comes out of a translation memory. As used herein, exact matches also include 100% matches, which are similar to exact matches, but do not necessarily result from exact matches because of differences that exist in the translation memory entry. For example, a match can be scored as 100% without having been an exact match for one of the following reasons: 1) unscored whitespace differences—using a different type of space character from that of the TM entry will prevent it from being selected as an exact match, 2) configured penalties through which the invention effectively ignores certain differences between the source and lookup text, or 3) segment repair through which repair heuristics can be applied to fix differences between the TM match and the original lookup text.

"Context" means discourse that surrounds a text segment and helps to determine its interpretation. Context, as used herein, may include different levels. For example, context may include: a usage context level and an asset context level. Each different context may require different verbiage depending on the intended audience of the content.

"Usage context" refers to discourse that surrounds a segment and influences how the invention derives the appropriate translation for content—by considering the text surrounding the text to be translated. Typically, the usage context is defined in conjunction with surrounding content, which provides insight into the meaning of the segment to be translated. Usage context can also have levels in terms of text that precedes a particular segment and text that follow (post) a particular segment.

"Asset context" refers to discourse relative to the asset environment in which the segment exists, i.e., background and perspective framework of the overall content in which a text segment appears.

"In-context exact (ICE) match" for a lookup segment means the source text must be an exact match and shares at least one context level with the TM entry providing the match.

"Lookup text" refers to the segment of text from the source asset for which a TM match is to be sought.

"Segment identifier" (SID) includes a label that defines the usage context in which a given segment is to be translated, and is associated with content at creation of the content. A SID provides a context identification for the given segment. A SID may include marker tags that define segment boundaries. As described below, a SID is an alternative to basing the usage context on surrounding segments.

II. GENERAL OVERVIEW

The present invention provides methods, systems and program products for, inter alia, determining a matching level of a plurality of source texts stored in a translation memory to a lookup segment to be translated. The invention generates high quality matches for source content from previously stored translations in a translation memory TM. In the related art, the best matches available were exact matches, i.e., matches where the source text was identical to one or more entries in the TM. However, there is no automated process for accurately choosing the best exact match for a given segment or validating whether a given exact match was an appropriate match for the context to which it is being applied. In particular, a segment may be translated differently under different circumstances or contexts. The appropriateness of an exact match requires evaluation of contextual information, which is based on the content usage (as defined by the sentences or segments surrounding it) as well as the asset context (which may require different verbiage depending on the intended audience.)

The current invention does not replace the exact match process. Instead, it provides a new level for matching, above exact matches, thus, employing a true reuse TM system which negates the need for manual validation and aids one in creating a TM which is as valuable as possible. In particular, one embodiment of the invention determines a matching level of a plurality of source texts stored in a translation memory to a lookup segment to be translated by determining any exact matches for the lookup segment in the plurality of source texts; and determining, in the case that at least one exact match is determined, that a respective exact match is an in-context exact (ICE) match for the lookup segment in the case that a context of the lookup segment matches that of the respective exact match. Accordingly, the ICE match determination determines the appropriateness of an exact match based on the context of the lookup segment. Those source texts that are exact matches and have a matching context are referred to as "in-context exact (ICE) matches." An ICE match is considered superior to an exact match in that it guarantees that the translation applied is appropriate for the context in which it is used. An ICE match is a translation match that guarantees a high level of appropriateness by virtue of the match having been previously translated in the same context as the segment currently being translated.

The invention leverages context information in order to: 1) determine the appropriateness of an exact match as a high quality (non-review requiring) match for new content, 2) select the best context match for a given lookup segment, and 3) guarantee that previously assigned translations for formerly translated content is always restorable. For new content, the invention leverages context information to find a high quality match from the TM based on segment usage context. The invention also ensures that the same content will always be translated the same way given its context—both on the asset and content level.

In terms of translation of a given lookup segment, suppose a source document is translated and all segments are stored in TM. If the exact same source document is then put through a second time, the document, including all its content, will be fully matched and the resulting translated document will be exactly the same as the first translated document. This behavior is straight forward, and expected. However, this can only be guaranteed as a result of using context information. To further understand the significance of this guarantee, consider a source document that has the same exact sentence repeated twice in two different places. Because the second usage may not have the same implied intentions as the first, it is translated differently. Now again consider an identical document being leveraged against the TM. Should the duplicated sentence have the same translation or should they differ as they did in the original document? Without taking the context of their usage into account, these sentences most likely would be translated the same by the TM. However, according to the invention, the context is considered, which guarantees that the two sentences will continue to have different translations as long as their usage context dictates such.

In terms of restoring previously translated text segments, the invention also ensures that the translations of new documents will not impact the ability to restore the translation of a formerly translated document, and provides a method of ensuring that translations are perfectly repeatable by leveraging a previously translated document against TM so that it will always result in the same translations as stored by the translator. Consider again two identical documents. The first document is translated, and the results are stored in the TM. When the second document is leveraged against the same TM, the document is presented as being fully translated with ICE matches. The usage context is identical to that of the first document. Now consider that the second document is targeted for a different audience. The source language text is not changed in this example since it is deemed suitable for both audiences. However, the translation into the target language requires some alterations. The translator updates the translations for this document, and stores the results into the TM. Time passes, and copies of both translated documents are again required. For space reasons, the original translated documents were deleted. Neither of the source documents has been altered, and thus, they still contain identical source text. The invention facilitates the regeneration of the original translated documents, each being identical to the originally translated documents (which themselves were not identical). Even though the content of the source documents is identical, the invention is able to leverage asset context information to ensure that the document specific translations are recoverable.

The invention may be exploited as part of a content management system such as Idiom's WorldServer™, or as a separate system. WorldServer™, for example, is a Web-based application that enables enterprises to manage their content in the context of the whole globalization process while leveraging established Web architecture, content management and workflow systems. Content management systems simplify the multiple complexities arising from deploying, for example, a global Web strategy, enabling a company's Website to efficiently support multiple countries and also different languages, locations and cultures. They provide structures and processes to collaboration among site managers, Web developers, content owners, translators and editors, resulting in a streamlined process, a synchronized global Web strategy and a coordinated global Web team. A translator uses a content management system to see what content he or she has to translate. In WorldServer™, the translator can either export the content needing translation to a third party editing tool, or use a translation workbench to perform the actual translation. A translator can be an individual contributor, including users that are adapting but not translating content and/or reviewers who review content. Content management systems store translated phrases into TM for later recall.

III. SYSTEM OVERVIEW

With reference to the accompanying drawings, FIG. 1 is a block diagram of an in-context exact match translation system 100 in accordance with the invention. It should be recognized that while system 100 is shown as a separate system, it may be implemented as part of a larger content management or translation system such as Idiom's WorldServer™. In this regard, description of system 100 may include certain functionality of a translation system, but omit other functionality for clarity. In addition, it should be recognized that while system 100 is shown in a client-server (e.g., Web-based) environment, other arrangements are also possible.

System 100 is shown implemented on a computer 102 as computer program code. To this extent, computer 102 is shown including a memory 112, a processing unit 114, an input/output (I/O) interface 116, and a bus 118. Further, computer 102 is shown in communication with an external I/O device 120 and a storage system 122. In general, processing unit 114 executes computer program code, such as system 100, that is stored in memory 112 and/or storage system 122. While executing computer program code, processing unit 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processing unit 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processing unit, etc.) not shown in FIG. 1 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown.

As discussed further below, system 100 is shown including an exact match determinator 130, an in-context exact (ICE) match determinator 132, a hash algorithm 133, a fuzzy match determinator 134, a translation memory TM generator 136, a segment retriever 138 and other system components (Sys. Comp.) 140. ICE match determinator 132 includes a context identifier 142, a match evaluator 144 and an ICE match prioritizer 146. Other system components 140 may include other functionality necessary for operation of the invention, but not expressly described herein. For example, other system components 140 may include an auto-translation system and/or content management system functionality such as that provided by Idiom's WorldServer™.

Although not shown for clarity in FIG. 1, it should be understood that client-side system 150 may include similar structure to computer 102, and include program code for providing functionality as described below.

Figure 3:
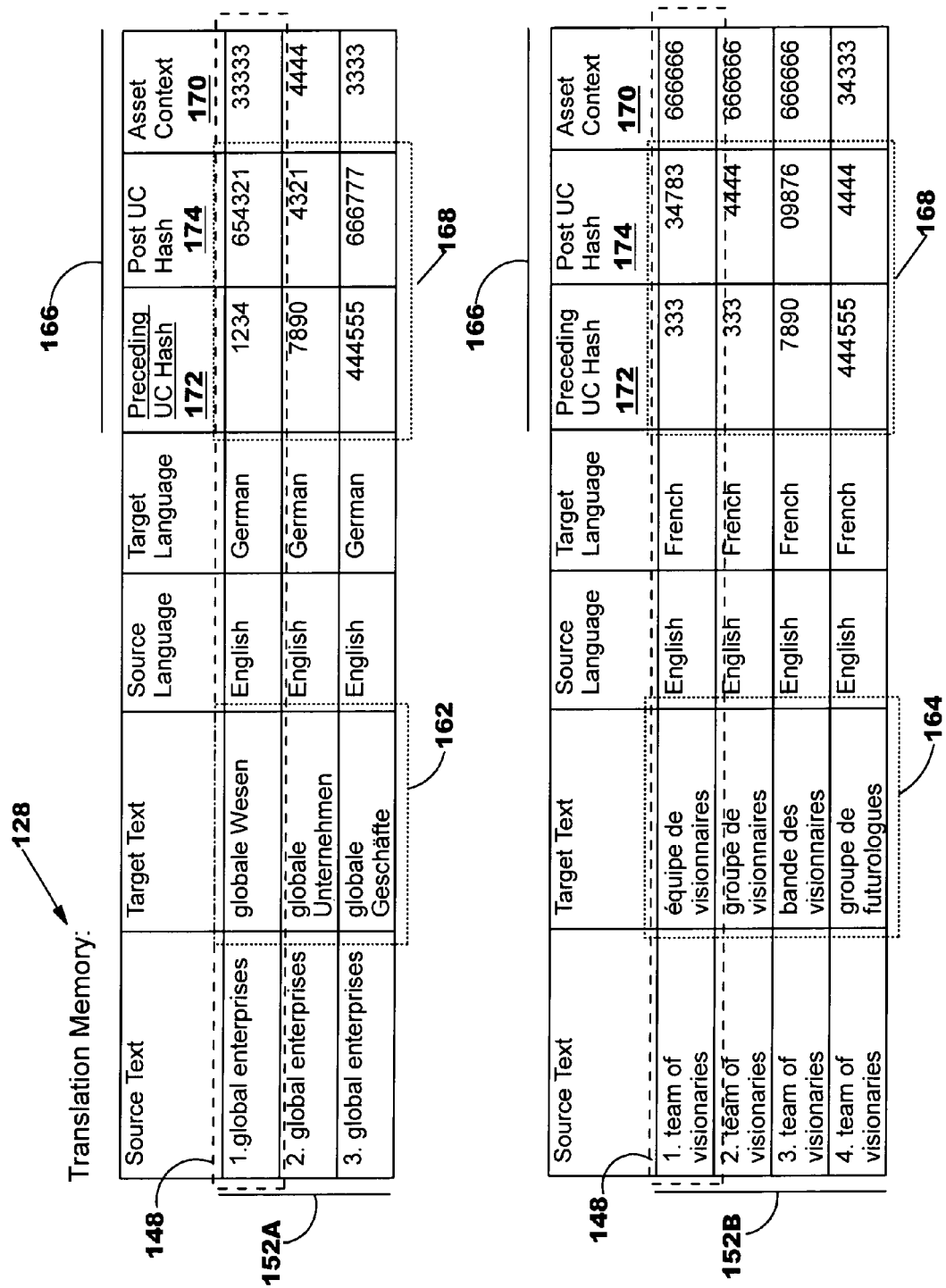
FIG. 3 shows a couple of entries in an illustrative translation memory.

FIG. 1 also shows a translation memory 128 (hereinafter "TM 128") for use by system 100. As shown in FIG. 3, TM 128 includes a plurality of TM entries 148 including stored target texts 162, 164 that have been previously translated into a particular language for particular source texts 152A, 152B, respectively (only two shown for brevity). For example, stored source text "global enterprises" 152A has been transcribed into a number of German translations 162, i.e., target texts, and stored source text "team of visionaries" 152B has been translated into a number of French translations 164, i.e., target texts. Each source text 152A, 152B is for comparison to a lookup segment. Each TM entry 148 also includes context identification 166 (only two labeled for clarity). In one embodiment, context identification 166 includes indications of different context levels such as a usage context portion 168 and an asset context portion (AC) 170. Asset context portion 170 includes an asset code, e.g., "33333," that identifies a particular asset to system 100. Other context levels may also be provided. In some cases, asset context portion 170 may be omitted.

In one preferred embodiment, each usage context portion 168 includes a preceding usage context (UC) hash code 172 and a post usage context (UC) hash code 174. Preceding UC hash code 172 is generated using hash algorithm 133 based on the text stream generated by a preceding segment that the respective source text appeared next to during translation. Similarly, post UC hash code 174 is generated using hash algorithm 133 based on the text stream generated by a following (post) segment that the respective source text appeared next to during translation. Hash algorithm 133 includes any now known or later developed hash algorithm that can convert a text stream into a unique numerical identifier. (It should be recognized that the hash codes shown are simplified for clarity.) Accordingly, each UC hash code indicates a unique usage context level for the respective source text. In an alternative embodiment, only one usage context hash code may be employed for a particular source text 152, and preceding and following segments.

Where a lookup segment 154 is assigned a context at creation, context identifications 166 may be generated using a user-specified SID, as described above, rather than hash algorithm 133.

It should be recognized that the particular codes used herein are for illustration purposes only.

IV. OPERATIONAL METHODOLOGY

Figure 2B:
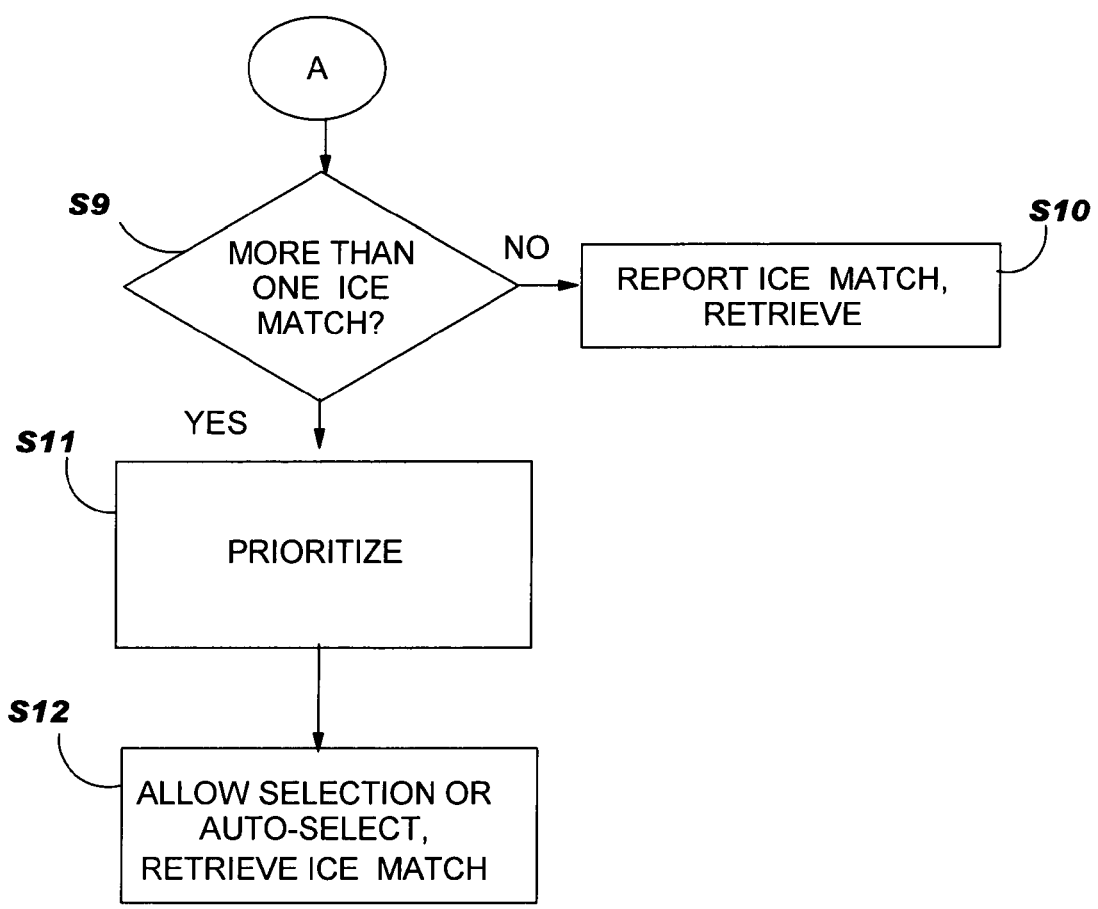

Turning to FIGS. 2A-B, a flow diagram of one embodiment of operational methodology of the invention will now be described. Discussion of FIGS. 2A-B will be made in conjunction with FIGS. 1, 3 and 4.

A. Preliminary Steps

Starting with FIG. 2A, as a preliminary step PS, in one embodiment, a lookup segment 154 is loaded by way of client computer system 150 directly linked or linked by a network of some type, e.g. a LAN, a WAN, or the Internet, to ICE match system 100. For example, lookup segment 154 may be loaded via a translation workflow application server (not shown), e.g., Idiom's WorldServer™, which ICE match system 100 may be a part of. Lookup segment 154 may be loaded as part of a larger asset. In this case, system 100 may conduct segmentation of the larger asset in any now known or later developed fashion to create lookup segments 154, e.g., as provided by Idiom's WorldServer™. Segmentation is the process through which an asset's content is parsed and exposed as translatable segments. The size of the segment depends on segmentation rules, which may be user defined.

B. General Methodology

The steps S1-S12 represent analysis for each lookup segment 154.

In a first step S1, any exact matches for lookup segment 154 in the plurality of source texts 152 in TM 128 is determined by exact match determinator 130. Exact match determinator 130 may function as in most conventional TM systems, which employ a string comparison algorithm to gauge the appropriateness of a translation stored within TM 128, where scores are awarded based on how closely the two strings match. A score of 100% typically indicates that an exact match has been found. For example, as shown in FIG. 3, lookup segment "global enterprises," when translated into German, would result in three exact matches: 1) globale Wesen, 2) globale Unternehmen, and 3) globale Geschäfte. Lookup segment "team of visionaries," when translated into French, would result in four exact matches: 1) équipe de visionnaires, 2) groupe de visionnaires, 3) bande des visionnaires, and 4) groupe de futurologues. More than one exact match may exist within TM 128 for each lookup segment 154 because multiple translations for any given segment and the meaning of a statement in a given language are not only derived from the words, but also from the context in which it is used. Accordingly, each previous translation can result in many target text translations 162, 164 for a particular source text 152, and hence, an identical lookup segment 154.

In step S2, a determination is made as to whether at least one exact match is determined, i.e., found in TM 128. If NO, at step S2, processing proceeds to step S3 at which fuzzy match determinator 134 determines whether there are any fuzzy matches for lookup segment 154 in any now known or later developed fashion. Any fuzzy matches for lookup segment 154 are reported at step S4. "Reporting" as used herein, can mean displaying results to a user, transferring and/or storing results. Although not shown, if fuzzy matches are not found, then conventional auto-translation may be instigated.

If YES at step S2, at step S5, ICE match determinator 132 determines whether a respective exact match is an in-context exact (ICE) match for lookup segment 154. As stated above, an "ICE match" means source text 152 must be an exact match and that it also shares a common context with lookup segment 154. In other words, an exact match that has a context identification 166 that matches that of lookup segment 154 is an ICE match. In one embodiment, the context for purposes of this determination includes only the usage context. However, other context matching levels may be employed, as will be described below.

Figure 4:
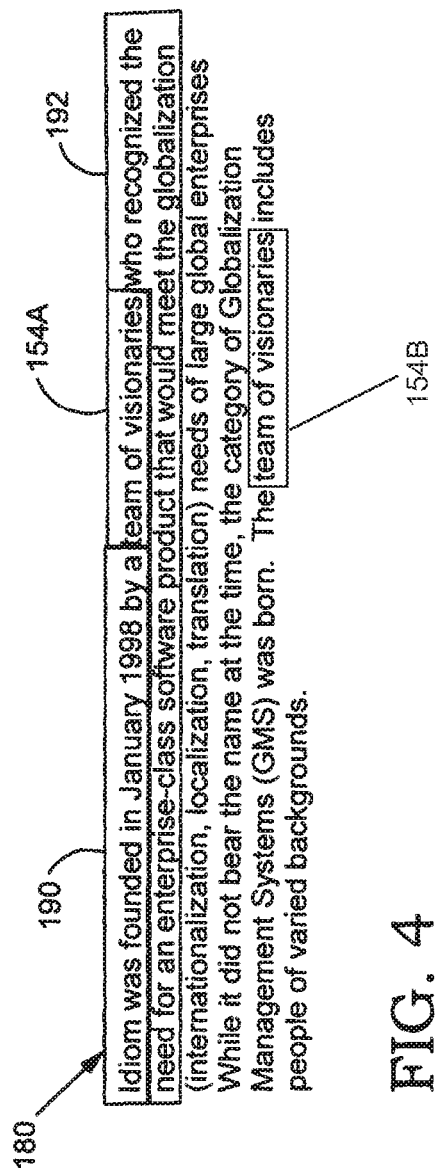
FIG. 4 shows an illustrative source asset including the entries of FIG. 3.

Step S5 includes two sub-steps. First, sub-step S5A, context identifier 142 identifies a context of lookup segment 154. In one embodiment, context identifier 142 identifies a context based on surrounding segments of lookup segment 154 in its source asset. In this case, hash algorithm 133 is implemented to determine a usage context for lookup segment 154 by calculating a lookup segment (LS) preceding UC hash code and a lookup segment (LS) post UC hash code. Again, hash algorithm 133 includes any now known or later developed hash algorithm that can convert a text stream into a unique numerical identifier. Referring to FIG. 4, an illustrative source asset 180 including lookup segment 154A in the form of "team of visionaries" is shown. A LS preceding UC hash code is formed based on the immediately preceding segment 190. For example, as shown in FIG. 4, a LS preceding UC hash code would be calculated for "Idiom was founded in January 1998 by a team of visionaries." Similarly, a LS post UC hash code would be calculated for the immediately following segment 192, i.e., "team of visionaries who recognized the need for an enterprise-class software product that would meet the globalization." An asset context for source asset 180 can be identified by context identifier 142 based on an asset hash, which is based on the system's identification of a particular asset, e.g., asset name, location within system, etc.

In an alternative embodiment, context identifier 142 identifies a context of lookup segment 154 according to a segment identifier (SID) associated with lookup segment 154, which as stated above, includes a label that defines the usage context in which a segment is to be translated. A SID may include marker tags that define segment boundaries. Preferably, a SD is associated with a source text 152 and/or lookup segment 154 during creation of the segment, i.e., by a content creator. However, a SID may be associated with a source text 152 and/or lookup segment 154, or overwritten at a later time, e.g., by a previous content translator.

In sub-step S5B, ICE match evaluator 144 makes an evaluation for each exact match for a lookup segment 154 by using context identification 166 stored with each candidate to determine whether it has been used in the same context as lookup segment 154, i.e., whether each exact match is an ICE match. The degree of context matching required in order for an exact match to be considered an ICE match can be pre-determined. In one embodiment, ICE match evaluator 144 indicates that a respective exact match is an ICE match for lookup segment 154 only in the case that each context level of lookup segment 154 matches that of the respective exact match. For example, where context includes a usage context level and an asset context level, the determining step may indicate that a respective exact match is an ICE match for the lookup segment only in the case that both the usage context level and the asset context level of the lookup segment matches that of the respective exact match.

Example

Referring to FIG. 3, assume an illustrative lookup segment 154 includes the text "team of visionaries," and that it is to be translated into French. Also, assume the lookup segment "team of visionaries" has a LS preceding UC hash code of 333 and a LS post UC hash code of 4444, and an asset context of 666666. (It should be understood that all hash codes in FIG. 3 are simplified for purposes of clarity). As shown in FIG. 3, exact match determinator 130 would determine four exact matches for lookup segment "team of visionaries," when translated into French: 1) équipe de visionnaires, 2) groupe de visionnaires, 3) bande des visionnaires, and 4) groupe de futurologues. ICE match evaluator 144 reviews the exact matches, and as shown in FIG. 3, would determine that when lookup segment "team of visionaries" is translated into French, the source text "groupe de visionnaires" has the same context because it has the same asset context 170 and usage context (hash codes) 172, 174. Accordingly, "groupe de visionnaires" would be an ICE match. The other source texts would not qualify as ICE matches because they do not have at least one context code of lookup segment "team of visionaries."

In an alternative embodiment, ICE match evaluator 144 may indicate that a respective exact match is an ICE match for lookup segment 154 even if only some context levels of the lookup segment matches that of the respective exact match.

Example

Referring to FIG. 3, assume an illustrative lookup segment 154 includes the text "global enterprises," and that it is to be translated into German. Also, assume the lookup segment "global enterprises" has a LS preceding UC hash code of 1234 and a LS post UC hash code of 4321, and an asset context of 7890. As shown in FIG. 3, exact match determinator 130 would determine three exact matches for lookup segment "global enterprises," when translated into German: 1) globale Wesen, 2) globale Unternehmen, and 3) globale Geschäfte. Assuming that only one usage context level is required for an exact match to be an ICE match, ICE match evaluator 144 reviews the exact matches, and as shown in FIG. 3, would determine that when lookup segment "global enterprises" is translated into German, the source texts "globale Wesen" and "globale Unternehmen" have the same context because they each have one UC hash code that matches one of LS UC hash codes. That is, "globale Wesen" has the same previous UC hash code as the lookup segment, and "globale Unternehmen" has the same post UC hash code as the lookup segment. The other source texts would not qualify as ICE matches because they do not have at least one context level of lookup segment "global enterprises." Details of how system 100 prioritizes multiple ICE matches will be described below.

If no ICE matches are determined, i.e., NO at step S6, at step S7, any exact matches are reported. Subsequently, at step S8, exact matches and fuzzy matches, i.e., from step S3-4, can be validated by a user in any now known or later developed fashion. In this case, exact matches and fuzzy matches are retrieved to their respective caches, and are made available to the translator by means of a client computer system 150 where the translator must validate each exact match in order to ensure that such match is the best match given the source asset 180 content and update each fuzzy match in order to match the source asset 180 content.

If ICE matches are determined, i.e., YES at step S6, then as shown in FIG. 2B, at step S9, ICE match prioritizer 146 determines whether more than one ICE match is found. If only one ICE match is determined, then at step S10, the single ICE match is reported. Once an ICE match is automatically reported, system 100 allows retrieval of the target text 162, 164 via segment retriever 138.

C. Multiple ICE Match Prioritization

Returning to FIG. 2B, step S11-12 represent optional steps for addressing the situation in which multiple ICE matches are determined in step S5, i.e., YES at step S9. In one embodiment (not shown), ICE match determinator 130 may simply allow a user to select an ICE match from a list of ICE matches. However, this is not preferred because it defeats one purpose of the ICE matches, i.e., not having to validate an exact match. In the preferred embodiment shown in FIG. 2B, if more than one ICE match is determined, then ICE match prioritizer 146 prioritizes (ranks) each ICE match according to a degree of context matching at step S11. As described above, the "degree of context matching" can be predetermined. This step prioritizes each ICE matches degree of context matching and either presents the ICE matches to a user for selection or automatically selects the highest ranked ICE match, at step S12. It should be understood that various formula for prioritizing multiple ICE matches are possible depending on the number of context levels. The following example illustrates one embodiment for prioritizing multiple ICE matches.

Example

Assume the context includes a usage context level and an asset context level, and the lookup segment "team of visionaries" is to be translated into French using TM 128 of FIG. 3 based on a source asset 180, as shown in FIG. 4. In this case, "team of visionaries" has four exact matches: 1) équipe de visionnaires, 2) groupe de visionnaires, 3) bande des visionnaires, and 4) groupe de futurologues, based on previously stored translations. Assume also that lookup segment "team of visionaries" has an LS previous UC hash code 333, an LS post UC hash code 4444 and an asset code 666666. Assume also that for an exact match to be indicated by ICE match determinator 131 as an ICE match, only one context level needs to match that of the lookup segment. In this case, each exact match is an ICE match. In particular, 1) "équipe de visionnaires" has matching previous UC hash code and asset code, 2) "groupe de visionnaires" has all matching context levels, 3) "bande des visionnaires" has a matching asset code, and 4) "groupe de futurologues" has a matching post UC hash code.

It should be recognized that, by definition, ICE matches are prioritized above unmatched lookup segments (i.e., those that require manual or machine translation), fuzzy matches, and exact matches that are not ICE matches. One prioritization rubric for ICE matches is shown below. In this rubric, rankings are listed in reverse order of precedence (i.e., the higher the number, the higher the prioritization): wherein the usage context (UC) level includes a preceding UC level and a post UC level, and the prioritizing step includes:

1. Full Usage Context (UC) Matches are Preferred Over Partial Usage Context (UC) Matches:

Assuming that exact matches that have only one UC hash code that match a hash code of the lookup segment are considered ICE matches (referred to as partial matches), preference is given to those ICE matches that have both the same previous and post hash UC codes as the lookup segment (referred to as "full UC matches") over the partial matches. In other words, an ICE match having both previous and post UC levels that match those of the lookup segment are preferred over an ICE match having only one of the previous and post UC levels matching those of the lookup segment. For the example, ICE match 2) "groupe de visionnaires" would be preferred over all others because it has matching preceding (333) and post (4444) UC hash codes with the lookup segment.

2. ICE Matches from Same Asset as Lookup Segment are Preferred Over Those from Other Assets:

In this case, two or more ICE matches cannot be differentiated by the above-described full-over-partial matching preference, i.e., the first preference is non-conclusive, a preference is given to the ICE match that is from the same asset as the lookup segment based on the asset code. In other words, where the first preference is non-conclusive, an ICE match from the same asset as the lookup segment is preferred over an ICE match from a different asset. In the example, ICE matches 1) "équipe de visionnaires" and 4) "groupe de futurologues" are both partial ICE matches, but ICE match 1) "équipe de visionnaires" is from the same asset "666666" as the lookup segment, and would be preferred.

3. Where Two or More ICE Matches from the Same Asset are Determined for a Lookup Segment, the ICE Match with a Closer Position to the Position of Lookup Segment within the Asset is Preferred:

This prioritization addresses the situation in which a lookup segment 154 exists in numerous locations within a single source asset 180, and as a result two or more ICE matches exist for a particular asset. For example, FIG. 4 shows source asset 180 including two occurrences of lookup segment "team of visionaries" 154A, 154B. In this case, ICE match prioritizer 146 evaluates the position within the asset of the particular lookup segment and will prefer the ICE match that is closest in position within the asset to the lookup segment over the other ICE matches from the same asset. In other words, where the second preference is non-conclusive, an ICE match with a closest position to a position of the lookup segment within the asset is preferred over the other ICE matches. This evaluation of position can be repeated for any number of repetitions of a lookup segment within a particular asset.

Once the prioritization is complete, at step S12, ICE match prioritizer 146 allows a user to select the ICE match based on the rank in any now known or later developed fashion, e.g., via a graphical user interface of client computer system 150, or automatically selects the highest prioritized ICE match. Once an ICE match is selected, system 100 allows retrieval of at least one target text 162, 164 via segment retriever 138.

Because of the high-level match quality provided by an ICE match, source texts that are determined to be ICE matches do not need to be reviewed or validated by the translator. They can be automatically accepted, thus decreasing the translation cycle time and resulting in cheaper translation costs. In addition, system 100 addresses the situation in which a plurality of lookup segments 154 that are substantially identical in terms of content are present in a single source asset 180. In this case, system 100 is capable of determining an ICE match for each lookup segment 154 based on a matching level. Typically, at least one lookup segment has a different ICE match than at least one other lookup segment to assist in this determination. If not, multiple ICE matches can be reported to a user for selection, as described above. System 100 also facilitates the translation of sections of content, which are repeated across different assets with minimal effort, including without limitation retrieving matches even when segments of content have been split or merged and/or allowing content blocks to be translated differently within a single asset.

The above-described operation can continue to process further lookup segments of source asset 180 against TM 128, or provide output to a user once an entire asset is completed.

D. Generating the Translation Memory

The existence of context information for TM entries is required for system 100 operation. As such, implementation of the invention requires storage of context information with every new translation added to the TM. This allows the context information of lookup segments to be effectively compared to the context information of previously translated segments without requiring access to the previously translated documents.

Figure 5:
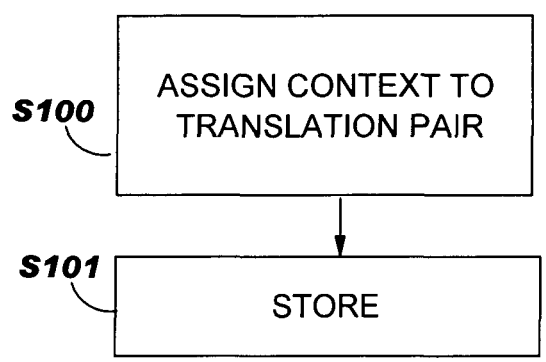
FIG. 5 shows a flow diagram of one embodiment for translation memory generation according to the invention.

Toward this end, in another embodiment, the invention provides a way through which the context information is stored along with each translation when translations are saved into TM 128, thus, not requiring a translator to keep any files around, such as the previously translated documents, for the invention to function. Turning to FIG. 5, the invention also includes a method of storing a translation pair of source text and target text in TM 128. In a first step S100, a context is assigned to the translation pair using TM generator 136. Context may be assigned, for example, by implementation of the above-described SIDs during creation of content or via operation of hash algorithm 133 during a translation pass. Next, in step S101, the context is stored with the translation pair in TM 128 by TM generator 136. As described above, the context may include a usage context level and an asset context level.

Figure 6:
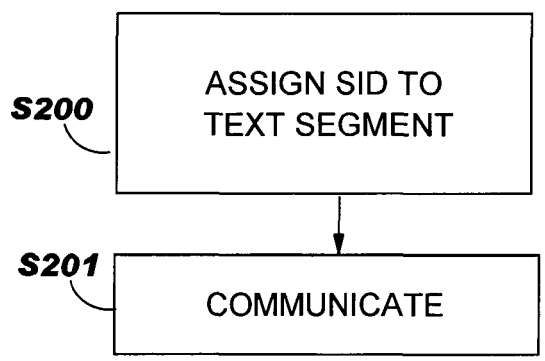
FIG. 6 shows a flow diagram of an alternative embodiment for translation memory generation according to the invention.

It should be recognized that the above-described TM generation may also be implemented on a client-side system 150 for when an asset (segment) is created. In this embodiment, the invention includes a client-side system 150 for interacting with a translation system (i.e., system 100 along with other content management system components 140) including TM 128. Turning to FIGS. 1 and 6, in this case, the client-side system 150 may operate by providing a SID assigner 200 for assigning (step S200) a segment identifier (SID) to a lookup segment 154 to be translated by TM 128, the SID indicating a usage context of the segment. SID assigner 200 may allow a user to associate predetermined SIDs or SIDs may be generated using, for example, a hash algorithm 133. In addition, client-side system 150 may include a communicator 202 for communicating (step S201) the SID assignment for storage as part of TM 128, e.g., by TM generator 136 of system 100.

V. CONCLUSION

The above-described invention provides value for translators by giving them the ability to perfectly match source content with that of the TM, alleviating the need to validate the source content with the TM and creating a truly reusable TM system, which allows for a more efficient translation process.

It is understood that the order of the above-described steps is only illustrative. To this extent, one or more steps can be performed in parallel, in a different order, at a remote time, etc. Further, one or more of the steps may not be performed in various embodiments of the invention.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., system 100), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

The invention may be embodied in other specific forms without departing from the spirit or essential characteristics thereof. It is to be understood that the above-described embodiments are simply illustrative and not restrictive of the principles of the invention. Various and other modifications and changes may be made by those skilled in the art which will embody the principles of the invention and fall within the spirit and scope thereof and all changes which come within the meaning and range of the equivalency of the claims are thus intended to be embraced therein.

What is claimed is:

1. A method for determining an in-context exact (ICE) match from context matching levels of a plurality of source texts stored in a translation memory to a lookup segment to be translated, the method comprising:
    generating a preceding usage context hash code for a preceding segment next to the lookup segment and post usage context hash code for a post segment next to the lookup segment;
    determining any exact matches between the lookup segment and the plurality of translation memory source texts;
    calculating for each exact match a context matching level based on:
        a match between the preceding usage context hash code for the lookup segment and a preceding usage context hash code generated for a segment of a translation memory source text, and
        a match between the post usage context hash code for the lookup segment and a post usage context hash code generated for the segment of the translation memory source text; and
    determining, for each exact match, if the segment of the translation memory source text providing the exact match is an ICE match for the lookup segment based on the calculated context matching level.

2. The method of claim 1, wherein the plurality of translation memory source texts providing the exact match includes at least two calculated context matching levels for the generated hash codes.

3. The method of claim 2, wherein determining the ICE match indicates that a respective exact match is an ICE match for the lookup segment only in the case that each of the generated preceding and post usage context hash code of the lookup segment matches that of the generated preceding and post usage context hash code for the respective exact match of the translation memory.

4. The method of claim 3, wherein, in the case that greater than one ICE match is determined, determining the ICE match includes prioritizing each ICE match according to a degree of context matching.

5. The method of claim 1, wherein determining the ICE match indicates that a respective exact match is an ICE match for the lookup segment only in the case that both the preceding usage context hash code level and the post usage context hash code level of the lookup segment matches that of the respective exact match.

6. The method of claim 1, further comprising, in the case that greater than one ICE match is determined, prioritizing each ICE match according to a degree of context hash code matching.

7. The method of claim 6, wherein the prioritizing includes:
first preferring an ICE match having both preceding and post usage context (UC) levels that match those of the lookup segment over an ICE match having only one of the preceding and post UC levels matching those of the lookup segment;
where the first preferring is non-conclusive, second preferring an ICE match from a same asset as the lookup segment over an ICE match from a different asset; and
where the second preferring is non-conclusive, third preferring an ICE match with a closest position to a position of the lookup segment within the asset.

8. The method of claim 7, further comprising allowing a user to select the ICE match based on the prioritization.

9. The method of claim 1, wherein the lookup segment includes a plurality of lookup segments that are substantially identical in terms of content, and wherein determining the ICE match includes determining an ICE match for each lookup segment.

10. The method of claim 9, wherein at least one lookup segment has a different ICE match than at least one other lookup segment.

11. The method of claim 1, further comprising allowing retrieval of at least one source text based on the context matching level.

12. The system of claim 11, wherein the ICE match determining means indicates that a respective exact match is an ICE match for the lookup segment only in the case that both the preceding usage context level and the post usage context level of the lookup segment matches that of the respective exact match.

13. A system for determining an in-context exact (ICE) match from context matching levels of a plurality of source texts stored in a translation memory to a lookup segment to be translated, the system comprising:
means for generating a preceding usage context hash code for a preceding segment next to the lookup segment and post usage context hash code for a post segment next to the lookup segment;
means for determining any exact matches for the lookup segment in the plurality of translation memory source texts;
means for calculating for each exact match a context matching level based on:
a match between the preceding usage context hash code for the lookup segment and a preceding usage context hash code generated for a segment of a translation memory source text, and
a match between the post usage context hash code for the lookup segment and a post usage context hash code generated for the segment of the translation memory source text; and
means for determining, for each exact match if the segment of the translation memory source text providing the exact match is an ICE match for the lookup segment based on the calculated context matching level.

14. The system of claim 13, wherein the ICE match determining means indicates that a respective exact match is an ICE match for the lookup segment only in the case that each of the generated preceding and post usage context hash code of the lookup segment matches that of the respective hash code of the translation memory.

15. The system of claim 14, further comprising means for, in the case that greater than one exact match is determined, ranking each exact match according to a degree of context matching.

16. The system of claim 13, further comprising means for, in the case that greater than one ICE match is determined, prioritizing each ICE match according to a degree of context hash code matching.

17. The system of claim 16; wherein the prioritizing means:
first prefers an ICE match having both preceding and post usage context (UC) levels that match those of the lookup segment over an ICE match having only one of the preceding and post UC levels matching those of the lookup segment;
where the first preference is non-conclusive, second prefers an ICE match from a same asset as the lookup segment over an ICE match from a different asset; and
where the second preference is non-conclusive, third prefers an ICE match with a closest position to a position of the lookup segment within the asset.

18. The system of claim 15, further comprising means for allowing a user to select the ICE match based on the rank.

19. The system of claim 13, wherein the lookup segment includes a plurality of lookup segments that are substantially identical in terms of content, and wherein the ICE match determining means determines an ICE match for each lookup segment.

20. The system of claim 19, wherein at least one lookup segment has a different ICE match than at least one other lookup segment.

21. The system of claim 13, further comprising a means for allowing retrieval of at least one source text based on the context matching level.

22. A program product stored on a non-transitory computer readable medium for determining an in-context exact (ICE) match from context matching levels of a plurality of translation memory source texts stored in a translation memory to a lookup segment to be translated, the computer readable medium comprising program code for performing the following steps:
generating a preceding usage context hash code for a preceding segment next to the lookup segment and a post usage context hash code for a post segment next to the lookup segment;
determining any exact matches for the lookup segment in the plurality of translation memory source texts;
calculating for each exact match a context matching level based on:
a match between the preceding usage context hash code for the lookup segment and a preceding usage context hash code generated for a segment of a translation memory source text, and a match between the post usage context hash code for the lookup segment and a post usage context hash code generated for the segment of the translation memory source text; and determining, for each exact match, if the segment of the translation memory source text providing the exact match is an ICE match for the lookup segment based on the calculated context matching level.

23. The program product of claim 22, wherein the plurality of translation memory source texts providing the exact match includes at least two calculated context matching levels for the generated hash codes.

24. The program product of claim 23, wherein the ICE match determining step indicates if each exact match is an ICE match for the lookup segment only in the case that both the generated preceding and post context matching level of the lookup segment matches that of the respective exact match.

25. The program product of claim 24, further comprising, in the case that greater than one exact match is determined, ranking each exact match according to a degree of context matching.

26. The program product of claim 22, wherein the ICE match determining step indicates that a respective exact match is an ICE match for the lookup segment only in the case that both the preceding usage context hash code and the post usage context hash code of the lookup segment matches that of the respective exact match.

27. The program product of claim 23, further comprising, in the case that greater than one exact match is determined, ranking each exact match according to a degree of context hash code matching.

28. The program product of claim 27, wherein the prioritizing step includes:

first preferring an ICE match having both preceding and post usage context (UC) hash codes that match those of the lookup segment over an ICE match having only one of the preceding and post UC hash codes matching those of the lookup segment;

where the first preferring step is non-conclusive, second preferring an ICE match from a same asset as the lookup segment over an ICE match from a different asset; and where the second preferring step is non-conclusive, third preferring an ICE match with a closest position to a position of the lookup segment within the asset.

29. The program product of claim 28, further comprising allowing a user to select the ICE match based on the prioritization.

30. The program product of claim 22, wherein the lookup segment includes a plurality of lookup segments that are substantially identical in terms of content, and wherein the ICE match determining step includes determining an ICE match for each lookup segment.

31. The program product of claim 30, wherein at least one lookup segment has a different ICE match than at least one other lookup segment.

32. The program product of claim 22, further comprising a step of allowing retrieval of at least one source text based on the context matching level.

* * * * *

UNITED STATES PATENT AND TRADEMARK OFFICE
CERTIFICATE OF CORRECTION

PATENT NO. : 9,342,506 B2
APPLICATION NO. : 14/519077
DATED : May 17, 2016
INVENTOR(S) : Russell G. Ross and Kevin Gillespie Page 1 of 1

It is certified that error appears in the above-identified patent and that said Letters Patent is hereby corrected as shown below:

Claims

In Column 17, Line 45, claim 12, please delete the text "Claim 11" and insert the text --Claim 13--.

Signed and Sealed this
Twenty-third Day of August, 2016

Michelle K. Lee
*Director of the United States Patent and Trademark Office*